(12) United States Patent
Chang et al.

(10) Patent No.: US 6,899,757 B2
(45) Date of Patent: May 31, 2005

(54) METHOD FOR PREPARING A PEARLESCENT PIGMENT BY COATING METAL OXIDES ON THE SYNTHESIZED MICA

(75) Inventors: Kil-Wan Chang, Inchun-si (KR); Kwang-su Lim, Inchun-si (KR)

(73) Assignee: Sky Chemical Co., Ltd., Chungcheongbuk-do (KR)

( * ) Notice: Subject to any disclaimer, the term of this patent is extended or adjusted under 35 U.S.C. 154(b) by 0 days.

(21) Appl. No.: 10/398,814

(22) PCT Filed: Dec. 5, 2000

(86) PCT No.: PCT/KR00/01411

§ 371 (c)(1), (2), (4) Date: Apr. 9, 2003

(87) PCT Pub. No.: WO02/33007

PCT Pub. Date: Apr. 25, 2002

(65) Prior Publication Data

US 2004/0096579 A1 May 20, 2004

(30) Foreign Application Priority Data

Oct. 14, 2000 (KR) ........................................ 2000-60532

(51) Int. Cl.[7] .............................................. C04B 14/20
(52) U.S. Cl. ...................................... 106/415; 106/417
(58) Field of Search ................................ 106/415, 417; 427/372.2, 385

(56) References Cited

U.S. PATENT DOCUMENTS

| | | | |
|---|---|---|---|
| 4,038,099 A | | 7/1977 | DeLuca, Jr. et al. ........ 106/291 |
| 4,086,100 A | | 4/1978 | Esselborn et al. .......... 106/291 |
| 4,544,415 A | * | 10/1985 | Franz et al. ................. 106/417 |
| 4,828,623 A | * | 5/1989 | Nitta et al. .................. 106/417 |
| 5,741,355 A | | 4/1998 | Yamamoto et al. ......... 106/417 |
| 6,056,815 A | * | 5/2000 | Fu .............................. 106/417 |

* cited by examiner

Primary Examiner—C. Melissa Koslow
Assistant Examiner—Shalie A. Manlove
(74) Attorney, Agent, or Firm—Abelman, Frayne & Schwab

(57) ABSTRACT

Disclosed is a method for preparing a pearlescent pigment by coating metal oxides on the synthesized mica, involving the steps of grinding the synthesized mica by agitating the mica with water in a water mixer to a particle size between 100 and 500 $\mu$m and separating the mica, dispersing the separated particles of the synthesized mica in water and adding acid thereto to adjust pH between 1 and 4, adding the metal oxide precursors and a basic aqueous solution thereto while maintaining said pH range until the desired color is attained, and thereby forming at least one hydrous metal oxide layer on the particles of the synthesized mica, and filtering, water-washing, drying and calcining the synthesized mica coated with the metal oxide layer. The method may further involve the step of further pulverizing the synthesized mica roughly ground in a water mixer by using a conventional wet pulverizer so that less than 100 $\mu$m of the synthesized mica may be used as a base material. The suitable surfactants can be used in a water mixer as well as a conventional wet pulverizer. The pearlescent pigment prepared according to the present invention has excellent luster and chroma, since a coating layer of metal oxides is smooth and the dispersibility of the particles is excellent.

11 Claims, 3 Drawing Sheets

30kv  60.0kx  167n  3390

25kv  60.0kx  167n  2790

METHOD FOR PREPARING A PEARLESCENT PIGMENT BY COATING METAL OXIDES ON THE SYNTHESIZED MICA

TECHNICAL FIELD

The preset invention relates to a method for preparing a pearlescent pigment, more specifically a method for preparing a pearlescent pigment having excellent luster and chroma, comprising coating metal oxides such as titanium dioxide, iron oxide and the like on the pulverized synthesized mica as a base material, characterized by modifying a grinding method of synthesized mica to improve the surface property thereof and/or adding suitable surfactants to the pigment to improve a dispersibility of the particles.

PRIOR ART

Since the origin era of mankind, they have sought various natural or synthetic pigments or dyes to express their own beauty. Among them, a pearlescent pigment has been widely used, because it has the inherent beautiful color of its own contrary to other general pigments or dyes. A general red pigment or dye expresses a red color in any visual angle. On the other hand, the pearlescent pigment expresses double or multiple colors depending on visual angle on account of an angular difference, which occurs when a portion of light permeating the pearlescent pigment is reflected and the other portion of light is refracted. This phenomenon is observed in a natural pearl, a fish scale, a clamshell, a bird's feather, or butterfly's wing and the like. In the past, there was used a guanine taken from the scales of fishes such as a herring and a hairtail in order to realize the pearlescent luster. However, since these natural resources cannot fulfil the demands of the pearlescent pigment, intensive studies on synthesis of pearlescent pigments have been in progress.

Representative examples of the synthesized pearlescent pigments include mica pigments coated with a lead carbonate, a BiOCl or titanium dioxide ($TiO_2$), but the pigments based on $Al_2O_3$, $SiO_2$, glass flake and the like have been recently developed. Especially, the most commercially and widely used pearlescent pigment is the mica pigment coated with titanium dioxide which employs high refractivity of titanium dioxide. As a base material such as mica is coated with metal oxides or mixture thereof having high refractive index in a form of single or multiple layers, an interface between two-layered media having different refractive index permits a visible light to partially reflect and transmit. As the light beams refracted or transmitted at the interface recombine constructively or destructively to enhance the intensity only for a certain wavelengths, the color corresponding to such wavelengths intensified at a reflective angle is observed. The said titanium dioxide-coated mica is advantageous in that it is excellent in weatherproof property, chemical resistance and physical property, is able to show diverse colors depending on the kind of the coated metal compound or dye and the coating thickness, and is able to control its particle size to accord a certain use by a grinding/separating process. In addition, the said pigment is also advantageous in that it is widely applied to automobile coating, cosmetics, wall paper, floor materials, plastic extrusion/injection, synthesized leather, printing ink, paint and the like. However, when natural mica is employed as a base material, there happens a problem that its final product has no uniform quality due to different iron contents, hardness, impurities and the like, and expresses yellowish color.

To solve the said problems, a technology to use the synthesized mica as a base material of the pearlescent pigment has been developed. However, when the synthesized mica is used to prepare a pearlescent pigment, the pearlescent pigment has to maintain the merit of the synthesized mica itself as well as has to exhibit more excellent luster and chroma than the natural mica-produced pigment. When a pearlescent pigment is prepared with a synthesized mica by a conventional wet pulverizing method as disclosed in U.S. Pat. No. 6,056,815, the luster and chroma of the pearlescent pigment deteriorate since the mica is ground by direct friction between the roller and the bottom surface to impair the surface of the mica. In other words, when the surface of the synthesized mica is not partially smooth and uniform, the level of luster and chroma required for the pearlescent pigment cannot be attained because of light scattering. Further, when a metal oxide coating is not intensely bound on a base material, luster or chroma is deteriorated. For the reason, it is assumed that the heat generated by friction transforms the interface of the base material to lead a deterioration of binding between metal oxide and base material, and results in partially peeling the coating on account of external physical force.

U.S. Pat. No. 5,741,355 to Yamamoto et al discloses a pearlescent pigment wherein the average refractive index of the synthesized mica is not more than 1.58, the surface of synthesized mica particles is smoothened and made flaky, the iron content in the synthetic mica is not more than 1.0% by weight and a pearl parameter given by specific volume and powder luster value of the synthesized mica is not less than 10. The '355 patent shows that fine powder of synthetic mica is added by at least 1% or more to the melt of synthetic mica during synthesis by melting of synthesized mica and is solidified and crystallized, such crystallized mass of synthetic mica is pulverized, or the melted substance as taken out through the perforation of the shell is crystallized in the heat insulating case and pulverized, in case that the synthetic mica is pulverized to particle size of 100 $\mu$m or smaller using hammer mill, roll mill, ball mill, etc., addition of high viscosity medium makes the synthetic mica flaky and thereby smoothening the surface of the mica. However, '355 patent has a problem that it requires an additional process to obtain the particles of the synthetic mica in such shape as shown in the patent, and thereby makes the process complicate and economically disadvantageous.

In the preparation of the pearlescent pigment, it is also required that the interface of base material should be activated so as to prevent the small particles of the synthesized mica from being agglomerated to the large particles or each other and that the metal oxide should be adsorbed onto the synthesized mica in a smooth and uniform form. When the metal oxide is not adsorbed onto the interface of base material, but agglomerated each other, the surface of the final product is rough or the metal oxide is not bound to the base material and form particles by themselves, and thereby deteriorate the luster and chroma of the pigment.

The present inventors have fervently studied for solving said problems. As a result, they have found that the surface of the synthesized mica is maintained smoothly enough for coating metal oxides thereon in case that the synthesized mica is ground to a pulverized powder by a water mixer rather than a conventional wet grinding means. In addition, the present inventors have developed a pearlescent pigment having an excellent luster and chroma by adding a suitable surfactant to the dispersion of the ground synthesized mica to uniformly disperse the synthesized mica particles and to uniformly adsorb the hydrous metal oxide onto the surface of the base material.

DISCLOSURE OF THE INVENTION

It is an object of the present invention to provide a pearlescent pigment having excellent luster and chroma or color saturation by keeping the surface of the synthesized mica used as a base material smooth during the grinding step thereof.

It is another object of the present invention to provide a pearlescent pigment in which superior dispersibility of particles can be obtained by adding surfactants prior to coating metal oxides on the synthesized mica.

It is still another object of the present invention to provide a pearlescent pigment, which is excellent in weatherproof, chemical resistance and physical properties and is able to exhibit various colors depending on the species of metal oxides or coating thickness.

It is still another object of the present invention to provide a pearlescent pigment prepared in accordance with the method of the present invention.

Said objects can be achieved according to the present invention as explained hereinafter. The present invention will be explained in detail as follows.

BRIEF DESCRIPTION OF THE DRAWINGS

The above objects, and other features and advantages of the present invention will become more apparent from the following detailed description when taken in conjunction with the drawings, in which.

BEST MODE FOR CARRYING OUT THE INVENTION

Figure 1:
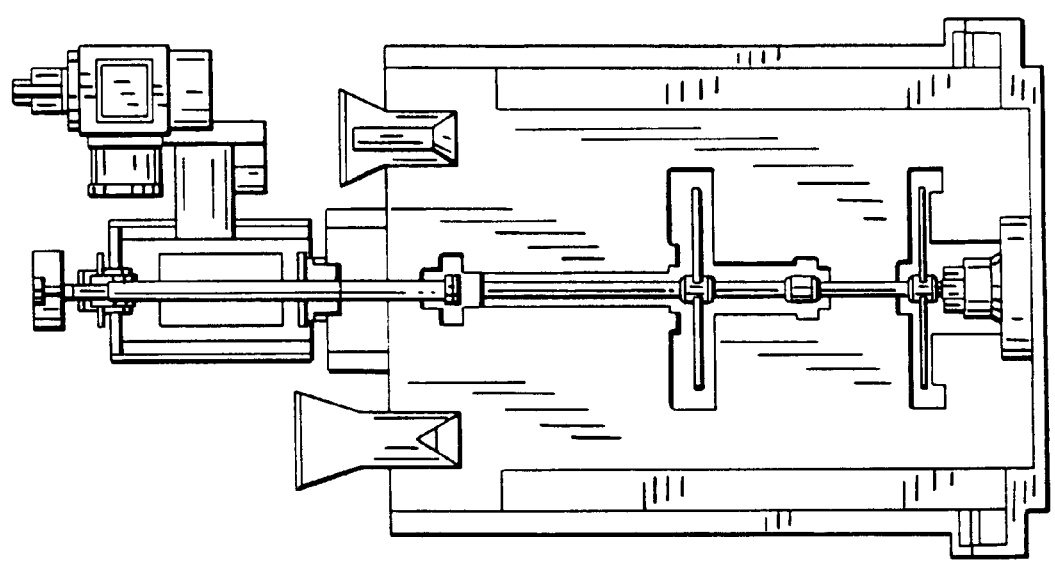
FIG. 1 is a cross sectional view of a water mixer having a pitch paddle-typed agitator structure used for grinding the synthesized mica according to the present invention.

In the first embodiment of the present invention, there provides a method for preparing the pearlescent pigments by coating metal oxides on the synthesized mica, comprising the steps of:

(1) grinding the synthesized mica by agitating the mica with water in a water mixer to a particle size between 100 and 500 $\mu$m and separating the mica;

(2) dispersing the separated particles of the synthesized mica in water and adding acid thereto to adjust pH between 1 and 4;

(3) adding the metal oxide precursors and the basic aqueous solution to the dispersion while maintaining said pH range until the desired color is attained, and thereby forming at least one hydrous metal oxides layers on the particles of the synthesized mica; and (4) filtering, water-washing, drying and calcining the synthesized mica coated with the metal oxides layers.

Said method may comprises an additional step of further pulverizing the synthesized mica roughly ground in a water mixer in the step (1) using a conventional wet pulverizer so that 100 $\mu$m or less of the synthesized mica may be used as a base material.

In the second embodiment of the present invention, there provides a method for preparing pearlescent pigments by coating metal oxides on the synthesized mica, comprising the steps of:

(1) grinding the synthesized mica by agitating the mica with water in a wet pulverizer to a particle size between 5 and 500 $\mu$m and separating the mica;

(2) dispersing the separated particles of the synthesized mica in water and adding 0.0001 to 1.0% by weight of cationic, anionic, nonionic or amphionic surfactant thereto;

(3) adding acid to the dispersion containing the surfactant to adjust pH between 1 and 4;

(4) adding the metal oxide precursors and the basic aqueous solution thereto while maintaining said pH range until the desired color is attained, and thereby forming at least one hydrous metal oxides layers on the particles of the synthesized mica; and (5) filtering, water-washing, drying and calcining the synthesized mica coated with the metal oxides layers.

The pearlescent pigments prepared in accordance with the present invention have excellent luster and chroma or color saturation, because the synthesized mica mass produced by a conventional method is ground by a water mixer without damage of their surfaces, and a suitable surfactant is added prior to the coating process of metal oxides thereon which is carried out separately or together with said grinding step thereby the coated particles do not agglomerate each other and the metal oxides are uniformly adsorbed/bound on the surfaces of the synthesized mica used as a base material.

In the present invention, the synthesized mica used as a base material for metal oxides layers is produced by a conventional resistance melting method. Since the synthesized mica mass produced by the above method have about 1 to 10 cm of particle size, further pulverization is carried out to obtain suitable particle sizes for grinding in the water mixer.

According to the present invention, it is required that it should be ground in a size of 5 to 500 $\mu$m to be used for preparing a pearlescent pigment.

FIG. 1 is a cross sectional view showing a water mixer having a pitched paddle-typed agitator, which is used for grinding the synthesized mica in accordance with the present invention.

In grinding the synthesized mica, water and the synthesized mica are introduced in the water mixer in a weight ratio of 10:1 to 1:1, agitated at the revolution speed of 100 to 1000 rpm for 0.5 to 2 hours to give particles of the synthesized mica, preferably in the form of flake, having particle size between 100 and 500 μm. The obtained synthesized mica is suitable for a base material of pearlescent pigment, because water serves as a buffer not to substantially impair the surface of the particles and easily soaks friction heat when the agitator paddles are collided with the particles of the synthesized mica in the water mixer. A water mixer with pitched paddle-typed agitator is preferably used. However, since it is substantially impossible to grind the synthesized mica in a particle size of 100 μm or less with a water mixer, it may be additionally ground in a conventional wet pulverizer to obtain smaller particle size of about 5 to 100 μm. A preferable example of such a wet pulverizer is an edge runner mill, which grinds the synthesized mica by a friction between a rotating roller and horizontal disc. As above, double grinding can make the surfaces of the particles much smoother compared with the single grinding using only conventional wet pulverizer.

The particles of the pulverized mica are preferable subjected to separation to give a narrow distribution of particle size, because the particle size of pearlescent pigment prepared in the present invention is altered depending on the use of the pigment, and the uniform particle size enhances luster of the mica.

According to the present invention, the representative examples of the metal oxide layer coated on the particles of the synthesized mica are titanium dioxide ($TiO_2$) layer, iron oxide ($Fe_2O_3$) layer, or combination thereof. The layer mixed or combined with the ocher metal oxide, or the additional metal oxide layer on the titanium dioxide layer and/or iron oxide layer may be formed for the purpose of changing the crystalline structure of a coating layer to improve luster, preventing discoloration or exhibiting more diverse colors. The examples of the metal oxides forming one layer together with the main metal oxides or the additional layer include tin dioxide ($SnO_2$), zirconium dioxide ($ZrO_2$), silicon dioxide ($SiO_2$), aluminum oxide ($Al_2O_3$), magnesium oxide (MgO), manganese dioxide ($MnO_2$) and the mixture thereof. Especially, the employment of tin dioxide has an advantage that the anatase structure of titanium dioxide($TiO_2$) coating layer is able to be changed to a rutile structure by precoating the surface of the synthesized mica with a thin layer of the hydrous tin dioxide ($SnO_2$) as disclosed in U.S. Pat. Nos. 4,038,099 and 4,086,100 to improve luster and weatherproof property. It is preferable that other assistant metal oxides than tin dioxide form one coating layer together with a main metal oxide, or a mixture of the main metal oxide and tin dioxide.

According to the present invention, the contents of the coating layer may be preferably about 5 to 60% by weight depending on the desired colors and luster, and for improving weatherproof property. As the thickness of the layer sets thicker, the colors of silver, gold, red, purple, blue and green exhibit in order. In case that multiple coating layers are formed, for example, forming the second coating layer following the first coating layer, the colors of silver, gold, red, purple, blue and green repeatedly exhibit in order. In addition to this forming of multiple structures, the calcined pigments may be re-coated with the metal oxides such as chromium, zirconium, aluminum, or may be treated with silane in order to exhibit diverse colors or render additional weatherproof property. Even though forming the multi-coating layer, the whole content of the metal oxides coated on the synthesized mica is preferably 5 to 80% by weight because too thick coating layer is liable to be peeled off the base material.

The method for preparing the pearlescent pigment is described hereafter.

At first, it is preferable that the particles of the synthesized mica are dispersed in water in an amount of about 5 to 15% by weight. It is preferable to use the deionized water, if possible, to prevent the disturbance of adsorption by ion. After raising the temperature of the dispersion of the synthesized mica particles to 60 to 100° C., the precursor material of the metal oxides or the mixtures thereof are added to the dispersion. For the precursor components of the metal oxides coated according to the present invention, the examples of the precursors of titanium dioxide are $TiCl_4$ ($TiOCl_2$ in an aqueous solution), $TiOSO_4$ etc., and the examples of the precursors of iron oxide are $FeCl_3$, $FeSO_4$ and the like. The examples of the preferable metal oxides to be further added are $SiCl_4$, $ZrOCl_2$, $SnCl_4$, $Na_2O$, $SiO_2.5H_2O$, $MnCl_2$, $MgCl_2$, $AlCl_3$ and the like. Acidity of the dispersion in the course of adding the precursors is retained preferably at pH 1 to 4. Acid, preferably hydrochloric acid is added to the dispersion to adjust pH between 1 and 4, and a basic aqueous solution such as sodium hydroxide is added thereto so that the hydrous titanium dioxide or iron oxide may be adsorbed on the base material by introduction of metal oxides precursors. In this process, it is important to titrate the precursors of metal oxides while maintaining said pH range. When pH of the dispersion is less than 1, a hydrolysis is not taken place, and when pH of the dispersion exceed 4, a hydrolysis is rapidly taken place and thereby causing the metal oxides not to be coated on the base material and to be agglomerated each other. This coating method is well known by the skilled in the art. Generally, a coating layer having anatase crystal structure is formed when the coating layer of the hydrous metal oxide is formed on the synthesized mica as a base material, however, a coating layer having rutile crystal structure may be formed by precoating the synthesized mica with tin dioxide ($SnO_2$) layer as disclosed above. As the titration of the precursors proceeds, the coating thickness of the hydrous metal oxide increases. The colors of silver, gold, red, purple, blue and green exhibit in proportion to the thickness. The synthesized mica coated as above is subjected to filtration, washing with water, drying, calcination, and screening to make final product in a mass production. The above processes after the coating process is well known in the art.

In the mean time, the present invention provides a pearlescent pigment prepared by adding a suitable surfactant prior to the coating process of metal oxide. Submicron-sized particles attached to the large particles or overlapped each other are dispersed on account of repelling force at the electrically charged interfaces of the synthesized mica by adding the surfactant, thereby the pigment particles are prevented from being agglomerated each other. Further, the interface of the synthesized mica and the interface of the hydrous metal oxide adsorbed to the base material by the hydrolysis are activated to allow smooth and stable adsorption. Particularly, when the hydrous metal oxides are not adsorbed on the base material and agglomerated by themselves to form the free particles, luster deteriorates and the amount of the metal oxide precursors is more needed than actually required. Accordingly, the amount of the generated waste can be reduced and the cost for preparing the pigment can be reduced by using a surfactant. The surfactant used in the present invention is selected from cationic, anionic, nonionic or amphionic surfactants. Examples of the anionic surfactant include sodium bistridecyl sulfosuccinate, sodium diisopropyl naphthalene sulfonate and the like. Examples of the cationic surfactant include alkylamine-guanidine polyoxyethanol, etc. Examples of the nonionic surfactant include sorbitan monooleate, etc. Examples of amphionic surfactant include cocoamidopropyl betaine, etc. The surfactant which can be used in the present invention is not limited to the above listed ones, various surfactants can be used as long as the present invention can be attained. Such use of the surfactant is advantageous in that the synthesized mica particles ground by a water mixer as well as the conventional wet pulverizer can be used. 0.0001 to 1.0% by weight of the surfactant is added to the dispersion of the synthesized mica, retained for 10 to 20 minutes, and then subjected to the coating process of the metal oxide.

The present invention is described in more detail by Examples and Comparative Examples, but the Examples are only illustrative and, therefore, not intended to limit the scope of the present invention.

EXAMPLE 1

The synthesized mica (JED-1 manufactured by Jiafeng Co., Ltd.) was ground in a water mixer and then separated to three portions as average sizes, 100 μm, 150 μm and 250 μm of the synthesized mica particles. 100 g of the synthesized mica particles were added to and dispersed in 1 liter of the deionized water, and then raised to the temperature of 60 to 100° C. Thereafter, 5% hydrochloric acid was added thereto to lower pH to 1 to 3, and refluxed for 10 minutes. 40% $TiOCl_2$ aqueous solution (a state $TiCl_4$ is soluted in water) was titrated and continued to maintain said pH with sodium hydroxide. As the amount of $TiOCl_2$ to be added is increased, the colors of silver, gold, red, blue and green was exhibited, titration of $TiOCl_2$ was stopped upon obtaining the desired color, refluxed for 10 minutes, and said solution was subjected to filtration, washing and drying, and then calcined in an electric furnace at the temperature of 700 to 1000° C. As a result of X-ray diffraction analysis for the calcined pigment, it was confirmed that titanium dioxide layer having anatase structure was formed on the surface of the synthesized mica.

EXAMPLE 2

The synthesized mica used in Example 1 was ground in a water mixer and then separated to three portions as average sizes, 100 μm, 150 μm and 250 μm of the synthesized mica particles. 100 g of the synthesized mica particles were added to and dispersed in 1 liter of the deionized water, and then raised to the temperature of 60 to 100° C. Thereafter, 5% hydrochloric acid was added thereto to lower pH to 1 to 3, and refluxed for 10 minutes. 10 to 100 cc of 5% $SnCl_4 \cdot n$ ($H_2O$) were added thereto and then refluxed for 10 minutes. 40% $TiOCl_2$ aqueous solution was titrated and continued to maintain said pH with sodium hydroxide. Titration of $TiOCl_2$ was stopped upon obtaining the desired color, refluxed for 10 minutes, and said solution was subjected to filtration, washing and drying, and then calcined in an electric furnace at the temperature of 700 to 1000° C. As a result of X-ray diffraction analysis for the calcined pigment, it was confirmed that titanium dioxide layer having a rutile structure was formed on the surface of the synthesized mica.

EXAMPLE 3

The same procedure as in Example 1 was carried out except that 0.0001 to 1% by weight of OS (sodium diisopropyl naphthalene sulfonate, manufactured by Cytec. Co., Ltd.) as an anionic surfactant was added before titrating 40% $TiOCl_2$ aqueous solution to obtain the pearlescent pigment. It was confirmed that the synthesized mica particles coated with titanium dioxide layer were not agglomerated each other and uniformly dispersed in the obtained pigment, and that the titanium dioxide layer was smoothly and uniformly formed on the surface of the base material.

EXAMPLE 4

Figure 2:
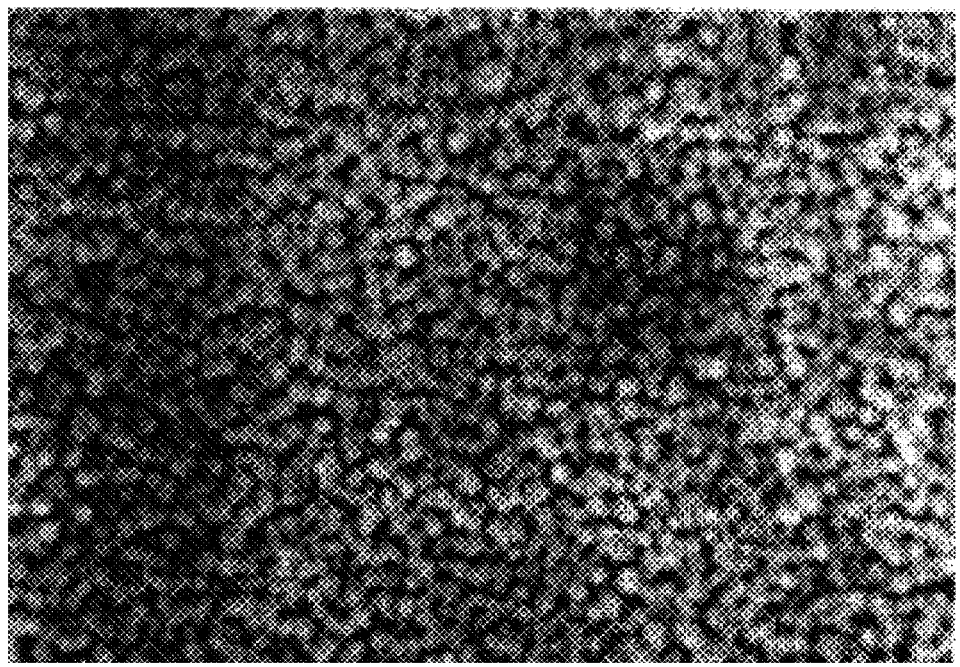
FIG. 2 is an electromicroscopic photograph showing the surface of pearlescent pigment particles prepared in Example 4.

The same procedure as in Example 1 was carried out except that 0.0001 to 1% by weight of C-61 (alkylamine-guanidine polyoxyethanol, manufactured by Cytec. Co., Ltd.) as an anionic surfactant was added before titrating 40% $TiOCl_2$ aqueous solution to obtain the pearlescent pigment. As is apparent in FIG. 2, it was confirmed that the synthesized mica particles coated with titanium dioxide layer were not agglomerated each other and uniformly dispersed in the obtained pigment, and that the titanium dioxide layer was smoothly and uniformly formed on the surface of the base material.

EXAMPLE 5

The same procedure as in Example 1 was carried out except that 0.0001 to 1% by weight of TR 70 (sodium bistridecyl sulfosuccinate, manufactured by Cytec. Co., Ltd.) as an anionic surfactant was added before titrating 40% $TiCCl_2$ aqueous solution to obtain the pearlescent pigment. It was confirmed that the synthesized mica particles coated with titanium dioxide layer were not agglomerated each other and uniformly dispersed in the obtained pigment, and that the titanium dioxide layer was smoothly and uniformly formed on the surface of the base material.

EXAMPLE 6

The same procedure as in Example 1 was carried out except that 0.0001 to 1% by weight of Monopol SP-1 (Sorbitan monooleate, manufactured by Dong Nam Synthesis. Co., Ltd.) as an anionic surfactant was added before titrating 40% $TiOCl_2$ aqueous solution to obtain the pearlescent pigment. It was confirmed that the synthesized mica particles coated with titanium dioxide layer were not agglomerated each other and uniformly dispersed in the obtained pigment, and that the titanium dioxide layer was smoothly and uniformly formed on the surface of the base material.

EXAMPLE 7

The same procedure as in Example 1 was carried out except that 0.0001 to 1% by weight of MITAINE CA (cocoamidopropyl betaine, manufactured by Cytec. Co., Ltd.) as an anionic surfactant was added before titrating 40% $TiOCl_2$ aqueous solution to obtain the pearlescent pigment. It was confirmed that the synthesized mica particles coated with titanium dioxide layer were not agglomerated each other and uniformly dispersed in the obtained pigment, and that the titanium dioxide layer was smoothly and uniformly formed on the surface of the base material.

EXAMPLE 8

The synthesized mica used in Example 1 was ground in a conventional wet pulverizer and then separated to average size 20 μm of the synthesized mica particles. 80 g of the synthesized mica particles were dispersed in 1 liter of deionized water, raised to the temperature of 60 to 100° C., and then 0.0001 to 1% by weight of TR 70 (sodium bistridecyl sulfosuccinate, manufactured by Cytec. Co., Ltd.) as an anionic surfactant was added thereto. Thereafter, 5% hydrochloric acid was added thereto to lower pH to 1 to 3, and refluxed for 10 minutes. 10 to 100 cc of 5% $SnCl_4.n(H_2O)$ were added to the dispersion and then refluxed for 10 minutes. 40% $TiOCl_2$ aqueous solution was titrated and continued to maintain said pH with sodium hydroxide. Titration of $TiOCl_2$ was stopped upon obtaining the desired color, refluxed for 10 minutes, and said solution was subjected to filtration, washing and drying, and then calcined in an electric furnace at the temperature of 700 to 1000° C. As a result of X-ray diffraction analysis for the calcined pigment, it was confirmed that titanium dioxide layer having rutile structure was formed on the surface of the synthesized mica.

EXAMPLE 9

The same procedure as in Example 1 was carried out except that the synthesized mica ground in a water mixer was further pulverized in an edge runner mill, and separated to five portions as average particle sizes, 8 μm, 10 μm, 200 μm, 50 μm and 80 μm, of the synthesized mica particles, and the obtained particles were coated with titanium dioxide layer. As a result of X-ray diffraction analysis for the calcined pigment, it was confirmed that titanium dioxide layer having anatase structure was formed on the surface of the synthesized mica and that luster was highly improved on account of more minute particles.

EXAMPLE 10

The same procedure as in Example 2 was carried out except that the synthesized mica ground in a water mixer was further pulverized in an edge runner mill, and then separated to five portions as average particle sizes, 8 μm, 10 μm, 200 μm, 50 μm and 80 μm of the synthesized mica particles, and the obtained particles were coated with titanium dioxide layer. As a result of X-ray diffraction analysis for the calcined pigment, it was confirmed that titanium dioxide layer having rutile structure was formed on the surface of the synthesized mica and that luster was highly improved on account of more minute particles.

EXAMPLE 11

The same procedure as in Example 3 was carried out except that the synthesized mica ground in a water mixer was further pulverized in an edge runner mill, and then separated to five portions as average particle sizes, 80 μm, 10 μm, 20 μm, 50 μm and 80 μm of the synthesized mica particles, and the obtained particles were coated with titanium dioxide layer. As a result of X-ray diffraction analysis for the calcined pigment, it was confirmed that titanium dioxide layer having anatase structure was formed on the surface of the synthesized mica and that the dispersibility among the particles was highly improved, and thus luster was excellent.

EXAMPLE 12

The same procedure as in Example 4 was carried out except that the synthesized mica ground in a water mixer was further pulverized in an edge runner mill, and then separated to five portions as average particle sizes, 80 μm, 10 μm, 20 μm, 50 μm and 80 μm of the synthesized mica particles, and the obtained particles were coated with titanium dioxide layer. As a result of X-ray diffraction analysis for the calcined pigment, it was confirmed that titanium dioxide layer having rutile structure was formed on the surface of the synthesized mica and that the dispersibility among the particles was highly improved, and thus luster was excellent.

COMPARATIVE EXAMPLE 1

Figure 3:
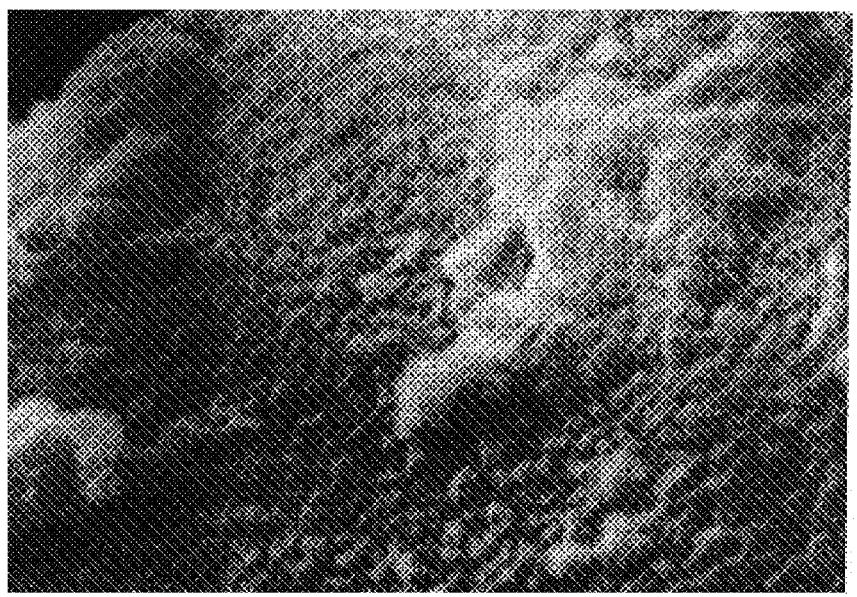
FIGS. 3 and 4 are electromicroscopic photographs showing the surface of pearlescent pigment particles wherein titanium dioxide coating layer is formed on the synthesized mica ground by a conventional wet pulverizer.
Figure 4:
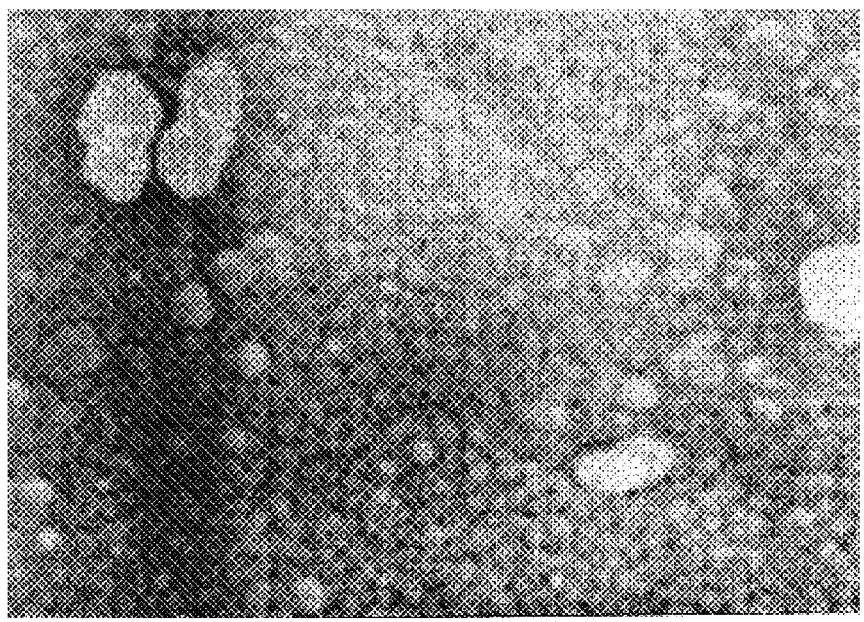

The same procedure as in Example 1 was carried out except that the synthesized mica "JED-1" (manufactured by Jiafeng Co., Ltd.) was ground in an edge runner mill and then separated to three portions as average particle sizes, 100 μm, 150 μm and 250 μm of the synthesized mica to obtain pearlescent pigment. As is apparent in FIGS. 3 and 4, it was confirmed that the synthesized mica particles in the obtained pigments were agglomerated each other, and that the titanium dioxide layer was not uniformly formed on the surface of the base material.

COMPARATIVE EXAMPLE 2

The same procedure as in Comparative Example 1 was carried out except that the synthesized mica particles having average particle sizes, 80 μm, 10 μm, 20 μm, 50 μm and 80 μm were obtained by using an edge runner mill, and then the particles were coated with titanium dioxide layer to obtain pearlescent pigments. The obtained pigments were better in luster and chroma than those obtained in Comparative Example 1, however the synthesized mica particles were slightly agglomerated each other, and the titanium dioxide layer was not satisfactory in flatness.

EXAMPLE 13

Evaluation of Luster and Chroma

The luster and chroma of the pearlescent pigments prepared in Examples 1 to 4 and Comparative Example 1 were evaluated as follows and the results were shown in Table 1, below. The evaluation was commenced by mixing a nitrocellulose solution having a viscosity of 1,200 cps with a pearlescent pigment (weight ratio of 94:6) by using a mixing bar, letting a certain amount of the mixture fall on a draw down card (D.D card) at the same place as ST sample, drawing down the mixture from the above-obtained card onto a concealing rate measure paper printed with black and white colors by use of a doctor blade, and drying it in the air. The luster and chroma were evaluated with naked eyes.

TABLE 1

|  | Ex. 1 | Ex. 2 | Ex. 3 | Ex. 4 | Comp. Ex. 1 |
|---|---|---|---|---|---|
| Luster | ⊙ | ⊙ | ⊙ | ⊙ | Δ |
| Chroma | ⊙ | ⊙ | ⊙ | ⊙ | Δ |

Δ: usual
⊙: very good

EXAMPLE 14

Evaluation of Luster and Chroma

The luster and chroma of the pearlescent pigments prepared in Examples 8 to 12 and Comparative Example 2 were evaluated as follows and the results were shown in Table 2, below. The evaluation was commenced by mixing a nitrocellulose solution having a viscosity of 1,200 cps with a pearlescent pigment (weight ratio of 94:6) by using a mixing bar, letting a certain amount of the mixture fall on a draw down card (D.D card) at the same place as ST sample, drawing down the mixture from the above-obtained card onto a concealing rate measure paper printed with black and white colors by use of a doctor blade, and then drying it in the air. The luster and chroma were evaluated with naked eyes.

TABLE 2

|  | Ex. 8 | Ex. 9 | Ex. 10 | Ex. 11 | Ex. 12 | Comp. Ex. 2 |
|---|---|---|---|---|---|---|
| Luster | ⊙ | ⊙ | ⊙ | ⊙ | ⊙ | ○ |
| Chroma | ⊙ | ⊙ | ⊙ | ⊙ | ⊙ | ○ |

○: good
⊙: very good

EXAMPLE 15

Evaluation on Surfactant's Effect

The luster, chroma and dispersibility of the pearlescent pigments prepared in Examples 3 to 7 and Comparative Example 1 were evaluated as follows. The luster and chroma of the pearlescent pigment were evaluated in a same manner as Examples 13 and 14, and the dispersibility of the pearlescent pigment was evaluated by comprehensively considering luster, chroma, shielding property and the like. The results were shown in Table 3, below.

TABLE 3

|  | Ex. 3 | Ex. 4 | Ex. 5 | Ex. 6 | Ex. 7 | Comp. Ex. 1 |
|---|---|---|---|---|---|---|
| Luster | ⊙ | ⊙ | ⊙ | ⊙ | ⊙ | ○ |
| Chroma | ⊙ | ⊙ | ⊙ | ⊙ | ⊙ | ○ |

TABLE 3-continued

|  | Ex. 3 | Ex. 4 | Ex. 5 | Ex. 6 | Ex. 7 | Comp. Ex. 1 |
|---|---|---|---|---|---|---|
| Dispersibility | ⊙ | ⊙ | ⊙ | ⊙ | ⊙ | ○ |

○: good
⊙: extremely good

INDUSTRIAL APPLICABILITY

According to the present invention, the synthesized mica as base material is ground in a water mixer to make the obtained particles smooth, to uniformly and smoothly coat metal oxides, and thus to obtain the pearlescent pigment having excellent luster and chroma. Further, the surfactant may be added to the synthesized mica ground by using a water mixer and/or a conventional wet pulverizer, and the obtained synthesized mica may be coated with metal oxides, and thereby attaining an excellent dispersibility of the particles and smooth coating layer.

The present invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A method for preparing a pearlescent pigment by coating metal oxides on the synthesized mica, comprising the steps of:
   (1) grinding the synthesized mica by agitating the mica with water in a wet pulverizer to a particle size between 5 and 500 μm and separating the mica;
   (2) dispersing the separated particles of the synthesized mica in water and adding 0.0001 to 1.0% by weight of cationic, anionic, nonionic or amphionic surfactant thereto;
   (3) adding acid to the dispersion containing the surfactant to adjust pH between 1 and 4;
   (4) adding the metal oxide precursors and the basic aqueous solution thereto while maintaining said pH range until the desired color is attained, and thereby forming at least one hydrous metal oxides layers on the particles of the synthesized mica; and
   (5) filtering, water-washing, drying and calcining the synthesized mica coated with the metal oxides layers.

2. A method for preparing a pearlescent pigment by coating metal oxides on the synthesized mica, comprising the steps of:
   (1) grinding the synthesized mica by agitating the mica with water in a water mixer to a particle size between 100 and 500 μm and separating the mica;
   (2) dispersing the separated particles of the synthesized mica in water and adding 0.0001 to 1.0% by weight of cationic, anionic, nonionic or amphionic surfactant thereto;
   (3) adding acid to the dispersion containing the surfactant to adjust pH between 1 and 4;
   (4) adding the metal oxide precursors and the basic aqueous solution while maintaining said pH range until the desired color is attained, and thereby forming at least one hydrous metal oxides layers on the particles of the synthesized mica; and (5) filtering, water-washing, drying and calcining the synthesized mica coated with the metal oxides layers.

3. The method for preparing a pearlescent pigment as set forth in claim 2, wherein the metal oxide comprises one or more than two metal oxides.

4. The method for preparing a pearlescent pigment as set forth in claim 3, wherein the metal oxide layer is titanium dioxide ($TiO_2$) layer, iron oxide ($Fe_2O_3$) layer, or the combination thereof.

5. The method for preparing a pearlescent pigment as set forth in claim 3, wherein the metal oxide layer comprises a main metal oxide component and an assistant metal oxide component, the main metal oxide component being selected from the group consisting of titanium dioxide ($TiO_2$), iron oxide ($Fe_2O_3$) and a mixture thereof, and the assistant metal oxide component being selected from the group consisting of tin dioxide ($SnO_2$), zirconium dioxide ($ZrO_2$), silicon dioxide ($SiO_2$), aluminum oxide ($Al_2O_3$), magnesium oxide (MgO), manganese dioxide ($MnO_2$) and a mixture thereof.

6. The method for preparing a pearlescent pigment as set forth in claim 2, further comprising a step of re-coating the calcined pigment particles with a metal oxide selected from the group consisting of chromium, zirconium, aluminum and a mixture thereof or treated with silane.

7. The method for preparing a pearlescent pigment as set forth in claim 1, wherein the anionic surfactant is sodium bistridecyl sulfosuccinate or sodium diisopropyl naphthalene sulfonate; the cationic surfactant is alkylamine-guanidine polyoxyethanol; the nonionic surfactant is sorbitan monooleate; and the amphionic surfactant is cocoamidopropyl betaine.

8. The method for preparing a pearlescent pigment as set forth in claim 2, wherein the grinding step of the synthesized mica is carried out by introducing water and the synthesized mica in the water mixer at a weight ratio of 10:1 to 1:1, and agitating them at the revolution speed of 100 to 1000 rpm for 0.5 to 2 hours.

9. The method for preparing a pearlescent pigment as set forth in claim 2, further comprising a step of pulverizing the particles of the synthesized mica to a size of 5 to 100 μm with a wet pulverizer after grinding the synthesized mica with the water mixer.

10. The method for preparing a pearlescent pigment as set forth in claim 1, wherein the metal oxide layer comprises one or more than two metal oxides.

11. The method for preparing a pearlescent pigment as set forth in claim 2, wherein the anionic surfactant is sodium bistridecyl sulfosuccinate or sodium diisopropyl naphthalene sulfonate; the cationic surfactant is alkylamine-guanidine polyoxyethanol; the nonionic surfactant is sorbitan monooleate; and the amphionic surfactant is cocoamidopropyl betaine.

* * * * *